W. M. WILLIAMS.
METHOD FOR ARTIFICIALLY COMPELLING THE FECUNDATION OF ALFALFA.
APPLICATION FILED APR. 9, 1917.
1,306,209.
Patented June 10, 1919.
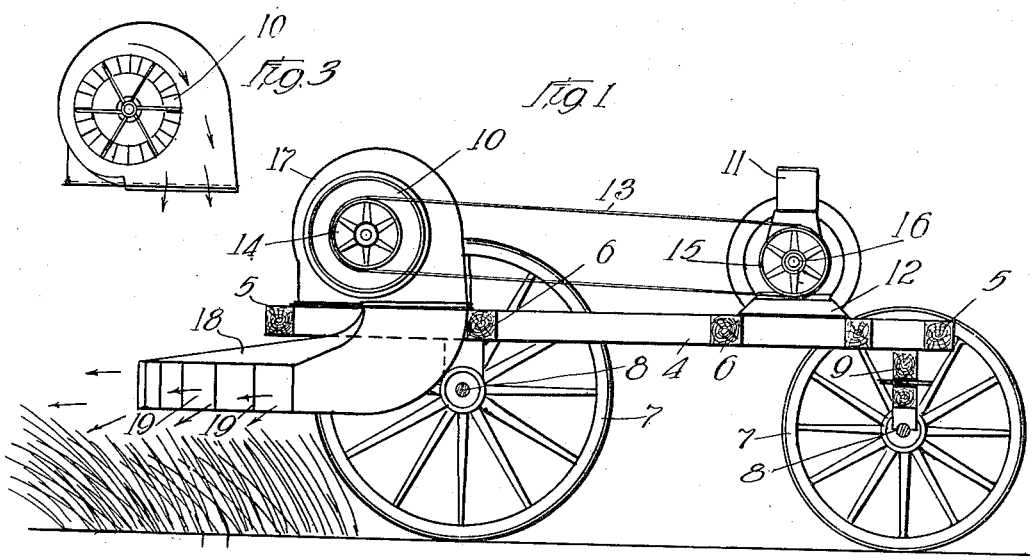
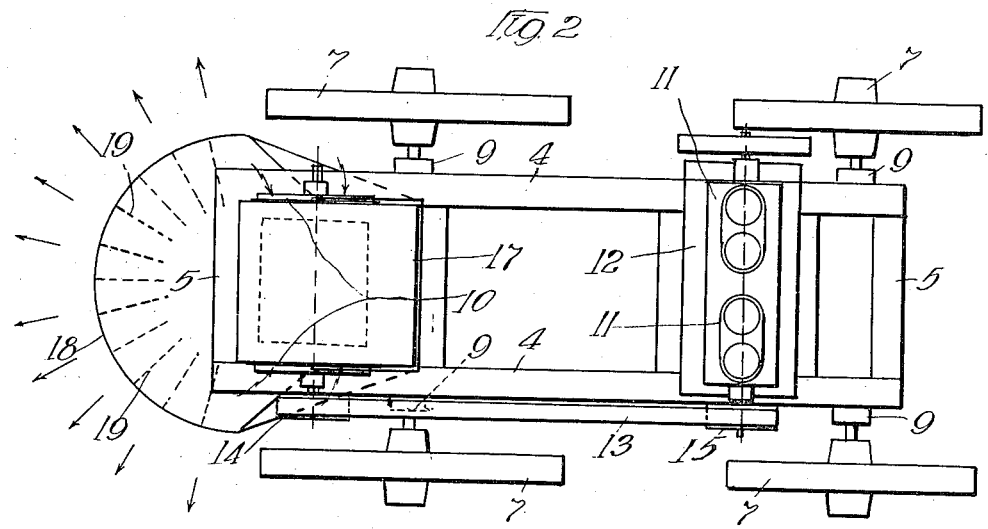
WITNESSES:
INVENTOR.
William M. Williams
BY Jno. G. Elliott
ATTORNEYS.

UNITED STATES PATENT OFFICE.

WILLIAM M. WILLIAMS, OF HARLEM, MONTANA.

METHOD FOR ARTIFICIALLY COMPELLING THE FECUNDATION OF ALFALFA.

1,306,209.  Specification of Letters Patent.  Patented June 10, 1919.

Application filed April 9, 1917. Serial No. 160,665.

*To all whom it may concern:*

Be it known that I, WILLIAM M. WILLIAMS, a citizen of the United States, and resident of Harlem, in the county of Blaine, and State of Montana, have invented certain new and useful Improvements in Methods for Artifically Compelling the Fecundation of Alfalfa, of which the following is a full, clear, and exact specification.

This invention relates to methods for artificially compelling fecundation of alfalfa, and thereby an annual seed yield, the average of which is substantially greater to the acre than is possible from nature's methods heretofore relied upon.

Alfalfa is the Spanish name for lucerne, *Medicago sativa*, a highly valuable pasture and forage plant, cultivated from ancient times, beneficial to, and greatly relished by farm stock, and which under favorable conditions yields several crops in a year, and increases the fertility of soil by the addition of nitrates, and may therefore be used to advantage in the rotation of crops.

The seed of alfalfa is produced from a bloom of violet or variegated color, of which on a single healthy plant there are from fifty to sixty blooms and sometimes more, and from ten to twelve floral leaves to every bloom, a stamen and a pistil for each floral leaf, the latter containing germs of young plant in numbers which when fertilized by the dust-like pollen on the tip end of the stamen are capable of producing a seed pod containing from six to eight seed.

Unlike other animal food plants, however, such for example as clover, the stamen of alfalfa is inclosed in a pod located externally of and branching from the stem of an opposing companion floral leaf confining the stamen until the bloom is ripe, and until concurrently therewith the pod is forcibly opened sufficiently for the stamen to bend by nature to physical contact with its companion floral leaf with a force sufficient to jar the dust-like pollen from its tip or head and as must be before the fertilization of any of the young plants can possibly take place.

Owing to the fact that the pistil is located at the base of and between the floral leaf and the stamen, the floral leaf, following the contact of the head of the stamen, operates as a deflector tending to direct more or less of the pollen downwardly to physical contact with the young plants, following which and soon thereafter the leaf shrivels and falls off, while in the meantime the stamen curls itself to form a seed pod confining the fertilized young plants until the seed therefrom are in a ripened state.

The difference of opinions between numbers of authoritative writers as to the means and conditions necessary for tripping alfalfa flowers, that is to say, for the bursting of the stamen containing pod and the movement of the stamen to contact with its floral leaf, seemingly indicates that the conditions precedent to the fecundation of alfalfa have been heretofore unknown, and are more or less mysterious, as for example:

It is the observation of one writer that wind never trips flowers in an alfalfa field; another that a very small number of flowers are tripped by other agents than insects; another who is inclined to the belief that insects are almost wholly responsible for the tripping of alfalfa flowers in nature; and moreover that wind and rain have very little to do with it, since violent agitation with the hand and an imitation of rain with the hose have proven to be very inefficient in the tripping of alfalfa flowers; and still another that, as the flowers of alfalfa plants may be easily tripped by squeezing them lightly between the fingers or between the hands or by grasping the plant near the base with one or both hands and drawing over the plant to the top, it is quite possible that some machine which could do this on a field scale would increase the crop of seed, especially in regions where insects are present in only small numbers; and further, that as to whether other agencies than insects trip alfalfa flowers in any marked degree, the results of those who have investigated the subject are contradictory.

And further that the enormous yield of seed in portions of the country where insects are very scarce, such as Harlem, Montana, is a very striking phenomenon, which leaves room to doubt that insects are the sole agents of tripping. The subject is one deserving of very careful consideration.

My observations and repeated experiments, however, demonstrate the fact to be that the fecundation of alfalfa if resulting at all from insects, is negligible; that it is not practical or possible to substantially or materially increase the seed yield of alfalfa from squeezing by machinery or otherwise the pod inclosing the stamen; that during the ripeness of the bloom neither the pod nor the stamen inherently possesses any force capable of opening the pod for the escape of the stamen therefrom to contact with its opposing floral leaf; that fecundation does and can only take place during the ripe stage of the bloom and then only when the pod is dry enough for the impact of a blow delivered externally thereto of sufficient force to burst it wide enough open for the inclosed stamen to escape to contact with its opposing floral leaf.

From the foregoing it therefore seemingly appears that the differences of opinion by the writers before referred to are due to their failure to take into consideration variations in weather conditions occuring from time to time throughout the progressive blooming of alfalfa during a season, and which no doubt accounts for that, which is of common knowledge, among growers of alfalfa, that only once in several years the seed yield is half or not much more than half that which it is capable of producing; and that frequently its seed yield is so small that it does not justify the expense of harvesting.

My investigations and experiments have resulted, however, in the discovery that nature relies and depends upon the presence of certain weather conditions occurring for the progressive ripening of the blooms of alfalfa for the production of seed therefrom; that the amount of the seed yield of alfalfa increases with the frequency of the occurrence of these weather conditions during the progressive ripening of its bloom throughout the season; and that as the frequency of such weather conditions decrease during the blooming season, the seed yield is accordingly less in amount.

In other words I have discovered the fact to be that the fecundation of the bloom of alfalfa takes place and can only take place when the ripe bloom in a substantially dry condition is exposed to a current of air, the velocity of which is sufficient to drive the pod inclosing the stamen to impact with other pods or members of the plant with a force bursting the pod open sufficiently for releasing the stamen therefrom.

I have discovered further that the force of the air current necessary for driving the stamen inclosing pod to bursting impact operates to scatter a portion of the pollen of the floral leaf of one bloom to other floral leaves.

In view of the foregoing, and bearing in mind that the blooming and ripening of the blooms of alfalfa is progressive throughout its season; that its fecundation can not take place before a bloom is ripe, or after it has passed its ripened state; and that owing to the unreliability and absence of weather conditions necessary for the fecundation of its bloom, its seed yield heretofore has been comparatively small, and the demand so great that the present market value of alfalfa seed is from $9.00 to $36.00 per bushel of sixty pounds, it will now be apparent that any method or means by which alfalfa may and can be compelled to produce in a season even fifty per cent. of the seed yield it is capable of, and much more, will be a substantial, material and valuable improvement in the alfalfa seed producing art.

Following my discovery of the weather conditions relied upon by nature as before described, for the fecundation of alfalfa, and repeated experiments over an extended area of the plants with a hand operated air pump throughout an extended period, when the weather conditions for producing fecundation were absent, it was successfully demonstrated that the fecundation of alfalfa may be and is compelled on exposing the ripe flowers thereof when in a substantially dry condition to an artificially produced blast of air driving the pod with bursting impact against the same or other members of the plant; and furthermore that with the use of an air blast machine such as is diagrammatically illustrated in the accompanying drawing, the invention resulting from my discovery is possible of being practically carried out on a commercial scale, as will presently be described.

In said drawings:

Figure 1 illustrates in side elevation a form and construction of an air blast machine in which my invention finds its embodiment.

Fig. 2 is a top plan view of the same, and—

Fig. 3 is a detail transverse section through the fan blower thereof.

Similar characters of reference indicate the same parts in the several figures of the drawing.

4—4 indicates the side bars, 5—5 the end bars and 6—6 stiffening cross bars constituting a suitable frame or bed of a wheeled vehicle, the wheels 7—7 of which rotate upon axles 8—8 secured to or as may be journaled in posts 9—9, secured to and depending from the side bars 4—4.

Upon one end of the frame, and preferably the forward end, is a fan blower 10 operated by a motor 11—11 either gas or electric, provided with a base 12, secured to and mounted upon the frame toward the end thereof opposite the fan blower, and which is connected with the fan blower by a belt 13 supported by a pulley 14 on the fan blower, and by a pulley 15 on the axle 16 of the motor, but it would be no departure from my invention to operate the fan by means of a gear wheel connection directly with the wheels of the vehicle.

Fan blower 10 may be of any construction adapted for the purposes of which it is used, and of which there are many old constructions differing from each other, and which in any event is inclosed in a casing 17 mounted upon the top of the vehicle frame, which casing has depending from its bottom and downwardly through the frame a box-like structure diverging outwardly toward its outer and open end for thereby spreading the air blast from the fan in a more or less sheet-like form in a horizontal plane parallel with and below the top of the alfalfa plants, and in a path occupied by the flowers of the plants.

As a means for directing the artificial air blast thus produced laterally from the machine and over the largest possible area consistent with the capacity of the fan for producing the results contemplated by its use and the width of the discharge end of the deflector 18, the latter may be provided with a number of partitions 19 diverging for this purpose from a common center, and also for directing against the floral bloom a number of air blasts with the same force in as many directions, and whereby the fecundation of ripe blooms may be compelled at a distance laterally beyond the path of travel of the machine through a field of alfalfa, and as would not be if the air currents were confined along lines parallel to the path of travel of the machine.

In other words by spreading the blast of air as it discharges from the machine in a fan like form, the capacity of any machine whatever width it may be, for compelling the fecundation of alfalfa, is accordingly increased.

With the operation of this or any other machine in which my invention finds its embodiment there may be and is produced a blast of air capable of and driving the stamen of every ripe and substantially dry bloom within the range of its operation, against other members of the plant with an impact bursting the pod and releasing the stamen therefrom, the contact of many of which with their companion floral leaf is no doubt in a number of instances hastened, and in any event more or less of their pollen is scattered to forcible contact with the pistils of other stamens and where this scattered pollen seemingly vitalizes the young plants which may not have been fecundated by their companion stamen.

For obtaining the best results from the use of an artificial air blast, the operation of the machine is repeated upon a field of alfalfa as frequently throughout the season as may be necessary for compelling the fecundation of the blooms as they become progressively ripe, and especially when in the meantime there have been no natural air currents of sufficient force for tripping the ripe flowers for the production of their fecundation.

Inasmuch as the air blast also operates to remove and carry away moisture from the pods, my discovery provides for the use of a means for more or less rapidly reducing the ripe pods to a degree of dryness, which is a condition precedent to their being burst from impact, and which for fecundation must occur before their companion leaf falls off, and certainly before the young plants die.

Having now disclosed my discovery, and described my invention, what I claim and desire to secure by Letters Patent is:

The herein described method for effecting the fecundation of alfalfa, consisting in subjecting the stamen inclosing pods as soon as they have arrived at maturity to an artificially produced uniform current of air directed against the pods with sufficient force to drive the pods to bursting impact against members of the plant and to release and uniformly distribute the pollen.

In witness whereof, I have hereunto set my hand and affixed my seal, this 6th day of April, A. D. 1917.

WILLIAM M. WILLIAMS. [L. S.]

Witnesses:
M. B. ELSNER,
JNO. G. ELLIOTT.